(12) United States Patent
Kwon et al.

(10) Patent No.: US 9,932,748 B2
(45) Date of Patent: Apr. 3, 2018

(54) MOVABLE AND HEIGHT-EXTENSIBLE AUTOMATED BICYCLE STORAGE

(71) Applicant: Yeong-Jong Kwon, Chungcheongbuk-do (KR)

(72) Inventors: Yeong-Jong Kwon, Chungcheongbuk-do (KR); Jong-Seok Lee, Chungcheongbuk-do (KR); Seung-Won Shim, Daejeon (KR)

(73) Assignee: JONG-SEOK LEE, Chungcheongbuk-do (KR)

( * ) Notice: Subject to any disclaimer, the term of this patent is extended or adjusted under 35 U.S.C. 154(b) by 0 days.

(21) Appl. No.: 15/112,791

(22) PCT Filed: Jan. 14, 2015

(86) PCT No.: PCT/KR2015/000362
§ 371 (c)(1),
(2) Date: Jul. 20, 2016

(87) PCT Pub. No.: WO2015/108324
PCT Pub. Date: Jul. 23, 2015

(65) Prior Publication Data
US 2016/0333601 A1 Nov. 17, 2016

(30) Foreign Application Priority Data
Jan. 20, 2014 (KR) .................. 10-2014-0006698

(51) Int. Cl.
*E04H 6/12* (2006.01)
*E04H 6/00* (2006.01)
(Continued)

(52) U.S. Cl.
CPC ............... *E04H 6/005* (2013.01); *B62H 3/00* (2013.01); *B62H 3/08* (2013.01); *B62H 3/12* (2013.01); *B65G 1/04* (2013.01); *E04H 6/12* (2013.01)

(58) Field of Classification Search
CPC ... B62H 3/00; B62H 3/08; B62H 3/12; B65G 1/04; E04H 6/005; E04H 6/12
See application file for complete search history.

(56) References Cited

U.S. PATENT DOCUMENTS 3,949,528 A * 4/1976 Hartger .................. E04H 6/005
217/37
5,369,920 A * 12/1994 Taylor ..................... E04H 6/005
446/488
(Continued)

FOREIGN PATENT DOCUMENTS

| EP | 0634317 A1 | 1/1995 |
| EP | 1221406 A2 | 10/2002 |
| KR | 10-2011-0094410 | 8/2011 |

OTHER PUBLICATIONS

PCT Search Report dated Mar. 23, 2015 for PCT/KR2015/000362 with English Translation.

*Primary Examiner* — Mark C Hageman
(74) *Attorney, Agent, or Firm* — Dentons US LLP

(57) ABSTRACT

The present invention relates to a movable and height-extensible automated bicycle storage facility of which the height is simply increased by separately manufacturing a section exceeding a height limit under the Road Traffic Act, transporting and assembling the section at a desired place to use the automated bicycle storage facility manufactured in a container shape at the place. The present invention is characterized by ensuring a sufficient height by coupling a height extension cover to the top of the bicycle deck to prevent a bicycle from hitting against the top of the bicycle deck when (Continued)

the bicycle is loaded at an angle in the bicycle deck in the front-rear direction and then lifted and loaded onto the second floor, and by temporarily reducing the height by separating the height extension cover in order not to violate the Road Traffic Act when moving the bicycle deck to another place.

4 Claims, 5 Drawing Sheets

(51) Int. Cl.
*B62H 3/08* (2006.01)
*B62H 3/12* (2006.01)
*B62H 3/00* (2006.01)
*B65G 1/04* (2006.01)

(56) References Cited

U.S. PATENT DOCUMENTS

| | | | |
|---|---|---|---|
| 7,481,027 B2 * | 1/2009 | Blume | B62H 3/04 |
| | | | 211/17 |
| 7,946,432 B1 * | 5/2011 | Swanson | B62H 3/08 |
| | | | 211/20 |
| 2005/0284036 A1 | 12/2005 | Blume | |
| 2007/0158975 A1 * | 7/2007 | Atchison | E04H 6/005 |
| | | | 296/182.1 |
| 2008/0208389 A1 | 8/2008 | Checketts | |
| 2016/0168843 A1 * | 6/2016 | Bell | B60P 3/122 |
| | | | 280/79.2 |

* cited by examiner

MOVABLE AND HEIGHT-EXTENSIBLE AUTOMATED BICYCLE STORAGE

CROSS-REFERENCE TO RELATED APPLICATIONS

The present application is the 371 National Stage of PCT International Application No. PCT/KR15/00362 filed 14 Jan. 2015, which claims the benefit of priority to Korea Application No. 10-2014-0006698 filed 20 Jan. 2014.

TECHNICAL FIELD

The present invention relates an automated bicycle storage facility whereby a new technology of simply increasing a height thereof by separately manufacturing a section exceeding a height limit under the Road Traffic Act, transporting the section to a desired place, then assembling the section at the desired place in order to use the automated bicycle storage facility manufactured in the shape of a container at the desired place.

BACKGROUND ART

Recently, bicycles are increasingly used to move short distances because traffic congestion and environmental pollution have become worse due to an increase in vehicle use. The bicycle, which is a kind of transportation means that is good for the health of users and which does not cause environmental pollution due to operation, can allow for efficient use of street spaces and enable individuals to move fast even if streets are congested.

Accordingly, the government and civic groups have actively encouraged the daily use of bicycles. As a part of those policies, the number of bike paths has been increased throughout the country and a policy for increasing convenience of bicycle use, for example, constructing bicycle parking lots where bicycles can be safely parked and kept at stations, terminals, shopping centers, public facilities, and residential areas, is in force.

Accordingly, various bicycle parking systems have been developed and used, and include systems such as an open type and a closed type, which can be further classified into a manual type and automatic type. However, these systems have the following shortcomings: the open type is contaminated by sunlight, dust, and rain and snow, and bicycles have a possibility of being stolen even if they are locked; a manual closed type, which is an individual closed type, requires users to manually operate the system and keep and return locks for individual lockers, so some users abuse the lockers and store things other than bicycles therein; and an automatic closed type, though convenient to use, is expensive, so it is difficult to construct the automatic closed type at a plurality of places.

In order to solve this problem, there has been proposed a 'Double deck type bicycle parking unit' in Korean Patent Application Publication No. 10-2011-0094410.

According to this document, while a bicycle is loaded onto an upper support, the rear wheel of the bicycle is automatically supported and it does not require larger force to move up/down a slider channel, so it is possible to conveniently load a bicycle.

However, this technology provides only the effect that relatively small force is required to load a bicycle onto an upper support, and force by a person is necessarily required to move a bicycle to a desired place or load a bicycle onto an upper support, so it is merely just a variation of a manual type storage facility.

Accordingly, it is preferable to implement the existing bicycle storage facilities into a movable automated type facility, and to this end, it may be possible to propose a technology of providing both of a loading rack that can keep bicycles in two stages and an automated stacker unit that can automatically load and unload bicycles onto and from the loading rack in a bicycle storage facility manufactured in the shape of a container.

However, when a long bicycle is stored in the bicycle storage facility, the front-rear length of the loading rack has to be increased, so the entire size of the bicycle storage facility is unnecessarily increased and the area that the bicycle storage facility occupies is also increased. Accordingly, it is difficult to ensure a space for constructing the bicycle storage facility, and this type of bicycle storage facility is also a manual type storage facility.

DISCLOSURE

Technical Problem

The present invention has been proposed to solve the problems with the existing bicycle storage facilities and an object of the present invention is to provide a movable and height-extensible bicycle storage facility that can be efficiently manufactured in a closed type at a factory, can be transported and used at a predetermined place, and can be manufactured to have a height that does not violate the Road Traffic Act so that a specific height extension cover, which is separately manufactured, can be coupled to an open top of the bicycle storage facility after the bicycle storage facility is transported to a desired place.

Technical Solution

In order to achieve the object of the present invention, an opening is formed at the top of a bicycle deck and a height extension cover that is separately manufactured is integrally coupled to the opening at the site of installation.

Further, the opening is formed larger in a front-rear width of a rectangular frame so that the frame where various mechanical parts are disposed for automatically loading a bicycle can be put inside through the opening.

Further, when a bicycle disposed at an angle is moved on a conveying line, an inclining lift on which the bicycle is seated is spaced from loading racks so that the bicycle does not come in contact with other bicycles on the loading rack while moving over the rear wheels of the bicycles.

Advantageous Effects

According to the present invention, since an automated bicycle storage facility is formed to have a height 4 m (including the height of a vehicle) and a width of 3 m that do not violate the Road Traffic Act, it is possible to smoothly and conveniently transport the automated bicycle storage facility to a desired place. Further, a specific height extension cover that is separately manufactured is coupled to the opening formed at the top of the automated bicycle storage facility at the site, so sufficient height is simply ensured so that bicycles can be loaded in two floors. Therefore, it is possible to remarkably improve efficiency of loading bicycles.

Further, the automated bicycle storage facility is not a building, but an apparatus that is manufactured at a factory and then delivered, so the manufacturing cost is reduced. Further, common electric and mechanical parts are used, so the cost for maintenance can be reduced.

Further, it is possible to transport the automated bicycle storage facility to a desired place and the install it at the place.

DESCRIPTION OF THE REFERENCE NUMERALS IN THE DRAWINGS

| B: Bicycle | B1: Rear wheel |
|---|---|
| 2: Frame | 10: Bicycle deck |
| 10a: Top plate | 11: Loading rack |
| 12: Conveying line | 13: Opening |
| 14: Vertical angle | 15: Reinforcing angle |
| 16: Loading rail | 20: Height extension cover |
| 21: Cover bracket | 22: Fastener |
| 30: Bicycle tray | 40: Inclining lift |

MODE FOR INVENTION

Exemplary embodiments for achieving the technical solution for technical problems of the present invention will be described in more detail.

Referring to the accompanying drawings, it can be seen that the entire configuration of the present invention is largely composed of a bicycle deck 10 and a height extension cover 20.

Hereinafter, the present invention will be described in more detail with reference to this schematic configuration to easily achieve the present invention.

The present invention is characterized by ensuring a sufficient height by coupling a height extension cover 20 to the top of the bicycle deck 10 to prevent a bicycle B from hitting against the top of the bicycle deck 10 when the bicycle is loaded at an angle in the bicycle deck 10 in the front-rear direction and then lifted and loaded onto the second floor, and by temporarily reducing the height by separating the height extension cover 20 in order not to violate the Road Traffic Act when moving the bicycle deck 10 to another place.

Figure 1:
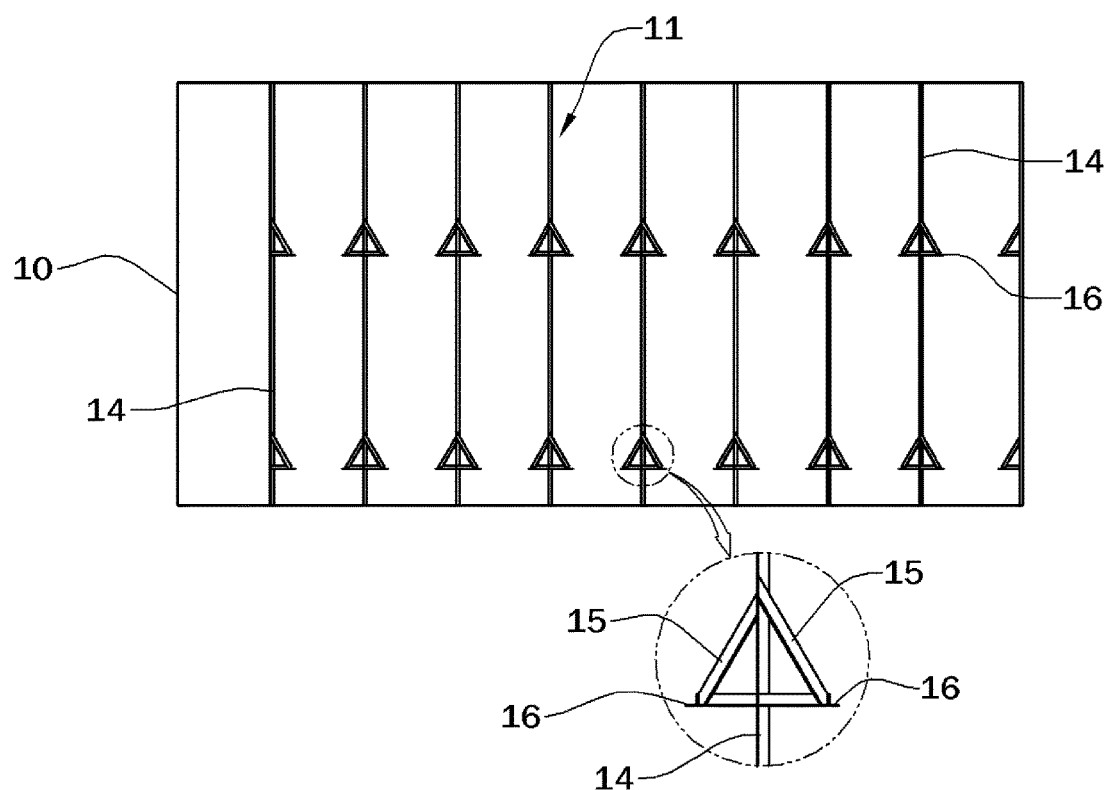
FIG. 1 is a front cross-sectional view of an automated bicycle storage facility to which the present invention is applied.
Figure 2:
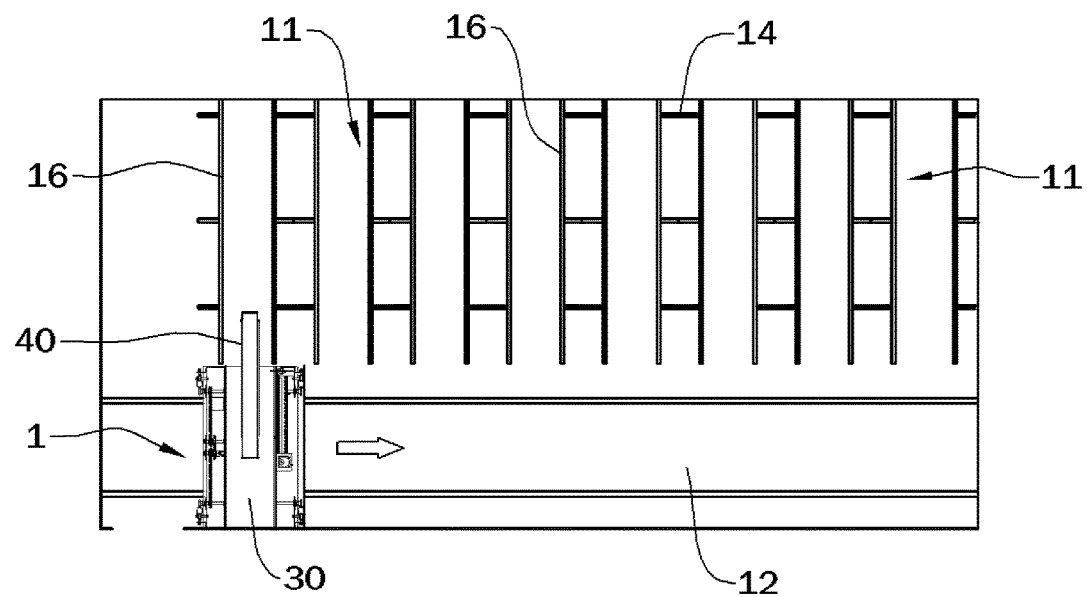
FIG. 2 is a horizontal cross-sectional view of an automated bicycle storage facility of the present invention.
Figure 3:
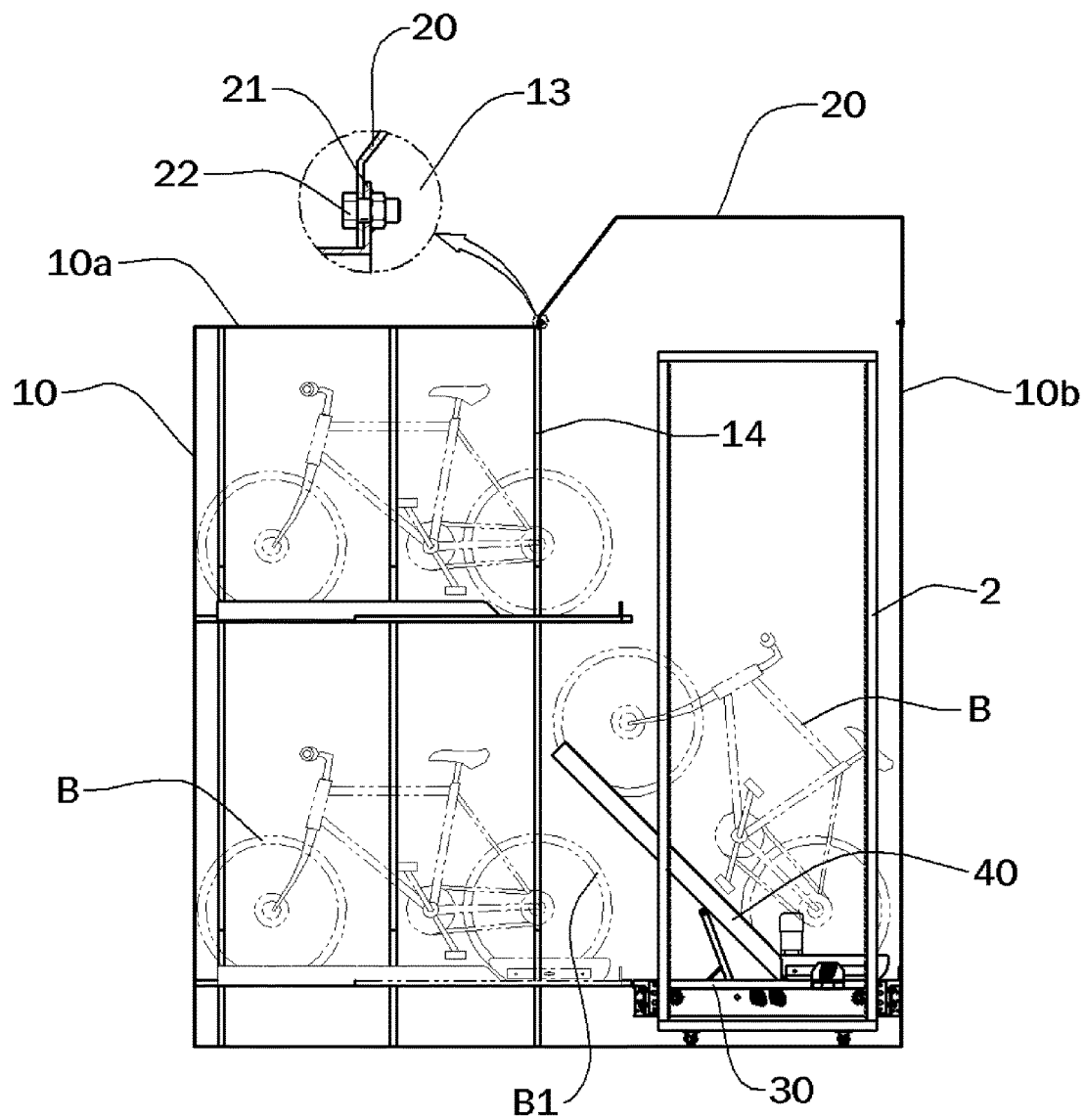
FIG. 3 is a side cross-sectional view of the automated bicycle storage facility of the present invention.

According to a technical configuration for this purpose, the bicycle deck 10, as shown in FIGS. 1 to 3, has a plurality of loading racks 11 arranged with regular intervals in the longitudinal direction, and a conveying line 12 for conveying a bicycle B to load the bicycle B on a desired rack 11 is disposed ahead of the loading racks 11.

The bicycle deck 10 maintains a height similar to the sizes of common containers, and an opening 13 partially formed through the top plate 10a of the bicycle deck 10 is disposed over the conveying line 12 and the height extension cover 20 is coupled to the opening 13 in order to ensure a sufficient height for preventing a bicycle B from hitting against the top plate 10a of the bicycle deck 10 when the bicycle B is seated at an angle on an inclining lift 40 on a bicycle tray 30 and then lifted and loaded onto the second floor.

The height extension cover 20 is coupled to the opening 13 at the site after the bicycle deck 10 is transported to the desired place, whereby it cover the opening 13 and increase the height of the bicycle deck 10 to prevent interference with the bicycle B seated at an angle.

That is, the bicycle deck 10 is manufactured at a factory, with the height extension cover 20 separated to have a height that does not violate the Road Traffic Act, so it is possible to transport the bicycle deck 10 on a truck to a desired place without violating laws. Further, when the bicycle deck 10 is placed on the ground, the height extension cover 20 can be combined with the bicycle deck 10 in a single unit at the place, as shown FIG. 3, by fastening the front and the rear thereof to a protruding cover bracket 21 on the top plate 10a close to the opening 13 and to the upper outer side of the front plate 10b of the bicycle deck 10, respectively, using fasteners 22.

Accordingly, a bicycle B seated at an angle on the inclining lift 40 can be conveyed over the rear wheels B1 of other bicycles B, which have been stored in the bicycle deck 10, on the conveying line 12 without hitting the bicycles B. Further, when the bicycle B is lifted and loaded onto the second floor, the bicycle can be smoothly loaded by the sufficient height additionally provided by the height extension cover 20.

Figure 4:
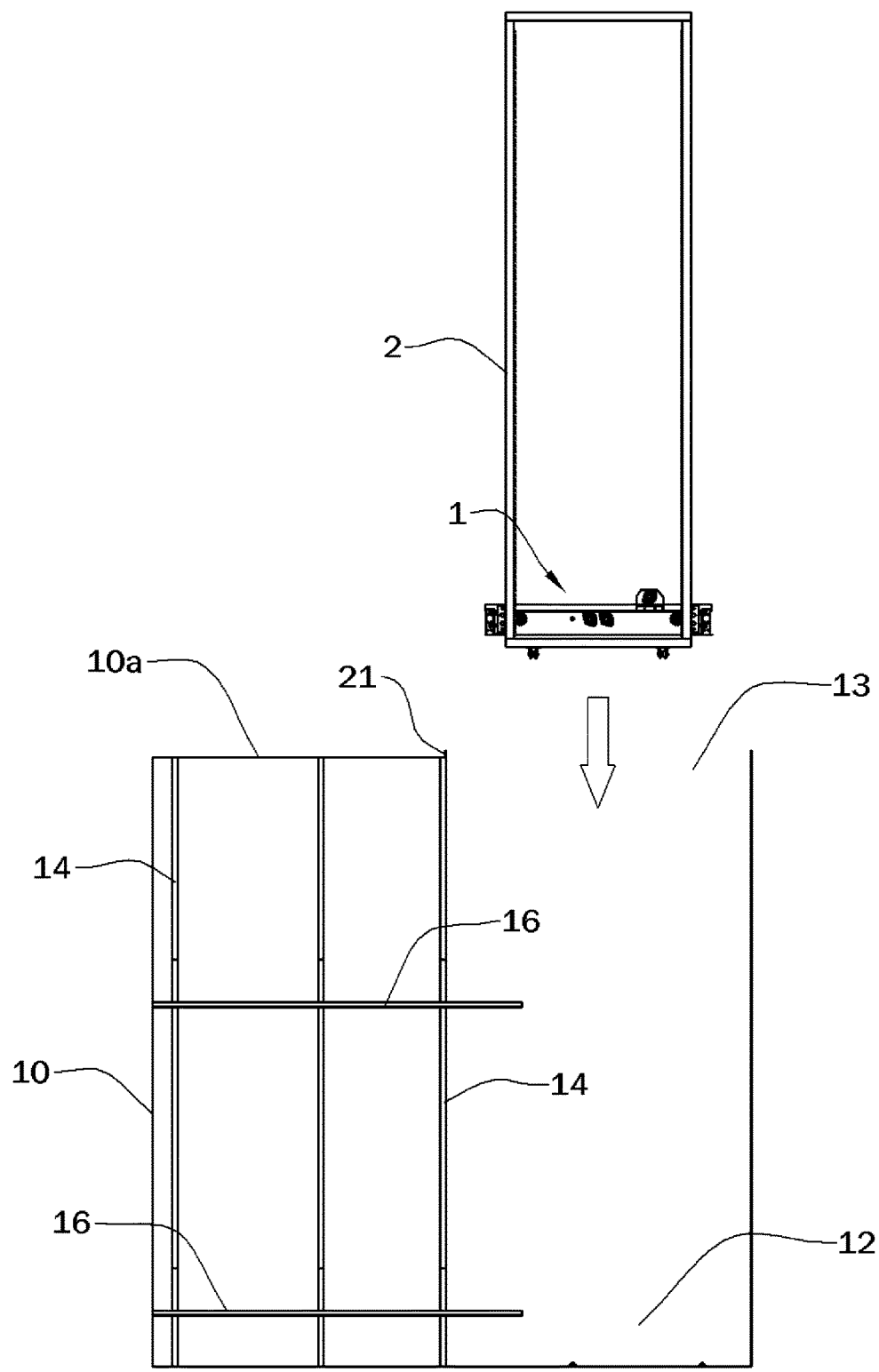
FIG. 4 is a vertical cross-sectional view when a frame is put into a bicycle deck of the present invention.
Figure 5:
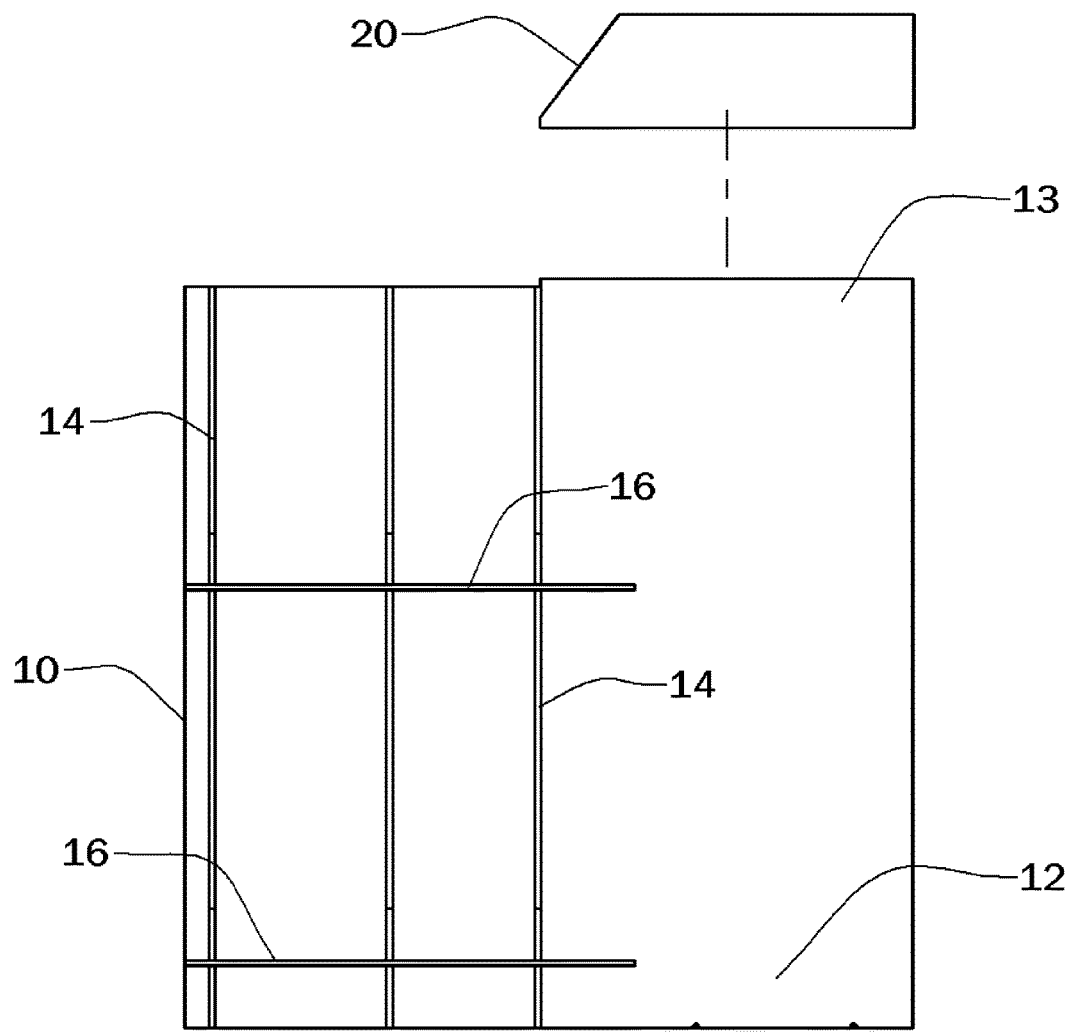
FIG. 5 is a vertical cross-sectional view when a height extension cover and a bicycle deck of the present invention are separated.

On the other hand, a rectangular frame 2 where various mechanical parts are installed such as an automated stacker unit 1 for automatically loading a bicycle B to improve efficiency of productivity is separately manufactured, the frame 2 is disposed on the conveying line 12 through the opening 13, as shown in FIG. 4, to be moved on the conveying line 12, and the opening 13 is formed larger in front-rear width of the frame 12 so that the frame 12 can be put inside through the opening 13.

Further, the loading racks 11 on which the bicycle tray 30 is disposed are arranged on two floors to keep more bicycles in the same area, a plurality of vertical angles 14 is arranged in the front-rear direction with predetermined gaps in the longitudinal direction and, as shown in FIGS. 1 to 3, reinforcing angles 15 formed in the shape of a right-angled triangle are integrally attached to upper and lower portions of the vertical angles 14, and angle-shaped loading rails 16 where the bicycle tray 30 is seated are symmetrically integrally connected to both ends of the reinforcing angles 15.

Accordingly, the bicycle tray 30 can be slid on a pair of loading rails 16 respectively between the loading racks 11 into two floors, whereby more bicycles can be stored.

According to the present invention, since a bicycle B is moved at an angle on the inclining lift 40 on the bicycle tray 30, the bicycle B and the inclining lift 40 are spaced from the vertical angles 14 disposed close to the conveying line 12 so that they can be smoothly moved without hitting against the vertical angles 14.

The invention claimed is:

1. A movable and height-extensible automated bicycle storage facility, comprising:

a bicycle deck having an enclosure, and within the enclosure having (a) a plurality of loading racks at a rear side of the enclosure which are arranged with a predetermined gap therebetween in a longitudinal direction, and (b) a conveying apparatus at a front side of the enclosure ahead of the loading racks, the enclosure have a first height over the loading racks, the enclosure having an opening at a top thereof over the conveying apparatus, the conveying apparatus having frame moveable in the longitudinal direction and a lift carried on the frame, the lift moveable in a vertical direction; and a height extension cover coupled to the top of the enclosure and over the opening, the height extension cover providing a second height to the enclosure over the conveying apparatus, the second height being greater than the first height, the opening being larger in a front to rear direction than the frame in the same direction.

2. The bicycle storage facility of claim 1, wherein a cover bracket protrudes on a top plate at the opening and the height extension cover is coupled to the enclosure by fastening a front and a rear of the height extension cover to the cover bracket and an upper outer side of a front plate of the bicycle deck using fasteners.

3. The bicycle storage facility of claim 1, wherein:
 a plurality of vertical angles spaced in a longitudinal direction are arranged with predetermined gaps in a front-rear direction on the loading racks,
 reinforcing angles are attached to upper and lower portions of the vertical angles, and
 loading rails are integrally connected to both ends of the reinforcing angles so that a bicycle tray can be loaded in two floors on the loading racks.

4. The bicycle storage facility of claim 3, wherein the vertical angles are disposed close to the conveying line apparatus so as to be spaced from a bicycle seated at an angle on an inclining lift on the bicycle tray and the inclining lift in order not to hit against the bicycle and the inclining lift when the bicycle and the inclining lift are moved on the conveying line apparatus.

* * * * *